United States Patent
Sharma et al.

(10) Patent No.: US 10,560,899 B2
(45) Date of Patent: Feb. 11, 2020

(54) PROGRAMMABLE HARDWARE SLEEP CYCLE CONTROLLER FOR 802.11 WIRELESS DEVICES SUPPORTING LOW-POWER

(71) Applicant: Microchip Technology Incorporated, Chandler, AZ (US)

(72) Inventors: Vishal Sharma, Irvine, CA (US); Umesh Munj, Aliso Viejo, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/158,434

(22) Filed: Oct. 12, 2018

(65) Prior Publication Data

US 2019/0116557 A1 Apr. 18, 2019

Related U.S. Application Data

(60) Provisional application No. 62/572,975, filed on Oct. 16, 2017.

(51) Int. Cl.
 *H04W 64/00* (2009.01)
 *H04W 52/02* (2009.01)

(52) U.S. Cl.
 CPC ... *H04W 52/0283* (2013.01); *H04W 52/0216* (2013.01); *H04W 52/0229* (2013.01)

(58) Field of Classification Search
 CPC . H04W 52/0283; H04W 64/00; H04B 1/1615
 See application file for complete search history.

(56) References Cited

U.S. PATENT DOCUMENTS

2007/0248034 A1* 10/2007 Hsu ............... H04W 52/028
 370/318
2009/0170459 A1* 7/2009 Karaoguz ............ H04B 1/1615
 455/231

FOREIGN PATENT DOCUMENTS

WO 2015/094363 A1 6/2015 ............ H04W 52/02

OTHER PUBLICATIONS

International Search Report and Written Opinion, Application No. PCT/US2018/055555, 10 pages, dated Dec. 7, 2018.

* cited by examiner

*Primary Examiner* — Myron Wyche
(74) *Attorney, Agent, or Firm* — Slayden Grubert Beard PLLC (57) ABSTRACT

A wireless device includes a sleep mode controller circuit (SMC), an RF circuit, and a processor. The SMC is configured to identify from a message that there is no impending data traffic to be received from another wireless device, put the wireless device into a power down mode powering down the processor and the RF circuit, and periodically checking for a another received message. Checking the RF message includes powering on the RF circuit on a periodic basis, determining whether another received message indicates that there is impending data traffic to be received from another wireless device, and, based on a determination that that there is impending data traffic to be received from another wireless device, powering up the processor.

18 Claims, 3 Drawing Sheets

PROGRAMMABLE HARDWARE SLEEP CYCLE CONTROLLER FOR 802.11 WIRELESS DEVICES SUPPORTING LOW-POWER

RELATED APPLICATION

The present application claims priority to U.S. Provisional Patent Application No. 62/572,975 filed Oct. 16, 2017, the contents of which are hereby incorporated in their entirety.

FIELD OF THE INVENTION

The present disclosure relates to sleep cycle control for wireless communication systems and, more particularly, to a highly programmable hardware sleep cycle controller for IEEE 802.11 wireless devices supporting low-power.

BACKGROUND

The IEEE 802.11 standards define operation for Wi-Fi and wide local area network (WLAN) systems and application. A wireless station (STA), access point (AP), or other wireless device according to the 802.11 standards for Wi-Fi may have a power save mode (PSM). The PSM may be configured to turn Wi-Fi off during expected times that Wi-Fi is not used. The wireless device may manage its PSM through using a signal called a traffic indication map (TIM). The TIM identifies wireless devices for which traffic is pending and buffered. Periodically, the wireless device will temporarily wake and look for a TIM at the appropriate time that the TIM is to be sent to the wireless device by, for example, an AP. The wireless device will wake, examine a received TIM (if available), and if the TIM includes a designation (such as a bit) that the particular wireless device has data to be sent, the wireless device will begin fully transmitting and receiving data. The interval or period for the wireless device to enter PSM and wait for a TIM may be negotiated between the AP and the wireless device when communication is originally established. The PSM may be implemented by simply not issuing or listening for RF signals.

SUMMARY

Embodiments of the present disclosure include a sleep mode controller circuit (SMC). The SMC may be included in a wireless device. In combination with any of the above embodiments, the wireless device may include a processor executing user-level or application-level software, wherein the SMC does not operate at such a user-level or application-level, but in a separate hardware configuration. The wireless device may include a radio-frequency (RF) circuit and an oscillator communicatively coupled to the processor and the RF circuit. In combination with any of the above embodiments, the SMC may be configured to identify from a first received message through the RF circuit that there is no impending data traffic to be received from another wireless device. In combination with any of the above embodiments, the SMC may be configured to, based on the received message, put the wireless device into a power down mode. In combination with any of the above embodiments, the power down mode may include powering down the processor and powering down the RF circuit. In combination with any of the above embodiments, the SMC may be configured to periodically check for a second received message, including powering on the RF circuit on a periodic basis, determining whether the second received message indicates that there is impending data traffic to be received from another wireless device, and, based on a determination that that there is impending data traffic to be received from another wireless device, powering up the processor. In combination with any of the above embodiments, the SMC may be configured to, based on a determination that there is no impending data traffic to be received from another wireless device, maintain the processor in a powered-down state. In combination with any of the above embodiments, the SMC may be configured to power down the RF circuit by disabling a phase-locked-loop circuit of the RF circuit. In combination with any of the above embodiments, the SMC may be configured to power down the RF circuit by disabling a clock signal from the oscillator to the RF circuit. In combination with any of the above embodiments, the SMC may be configured to maintain operation of the oscillator while the RF circuit and the processor are powered down. In combination with any of the above embodiments, the SMC may be configured to shut down the oscillator while the RF circuit and the processor are powered down. In combination with any of the above embodiments, the SMC may be configured to save and update a timer value upon powering down the RF circuit, the timer value recorded by a modem of the wireless device and configured to identify when the second message is to be received by the wireless device.

In combination with any of the above embodiments, the wireless device may include a frame parser circuit configured to, while the processor is powered down, periodically check for the second received message upon activation by the SMC and, during the check for the second received message, identify whether the second received message identifies a type of the wireless device, and, based on whether the second received message identifies the type of the wireless device, continue parsing the second received message. In combination with any of the above embodiments, the frame parser circuit may be configured to, while the processor is powered down, periodically check for the second received message upon activation by the SMC, during the check for the second received message to identify a field of the second received message upon which to perform pattern matching, and, based upon the field of the second received message matching a pattern, determine that the second received message indicates that there is impending data traffic to be received from another wireless device. In combination with any of the above embodiments, the frame parser circuit may be configured to, while the processor is powered down, periodically check for the second received message upon activation by the SMC. during the check for the second received message to identify a field of the second received message upon which to perform differencing analysis, and, based upon the field of the second received message differs from a corresponding field of a previously received message, determine that the second received message indicates that there is impending data traffic to be received from another wireless device.

Embodiments of the present disclosure may include a medium with instructions for execution, the instructions, when executed, configure the SMC or the frame parser circuit to perform the operations of any of the above embodiments.

Embodiments of the present disclosure may include a wireless device. The wireless device may include any of the frame parsers or SMCs of any of the above embodiments.

Embodiments of the present disclosure may include a communications system. The communications system may include two or more of the wireless devices of any of the above embodiments.

Embodiments of the present disclosure may include methods performed by the instructions when executed, SMCs, frame parser circuits, wireless devices, or communication systems of any of the above embodiments.

DETAILED DESCRIPTION

Figure 1:
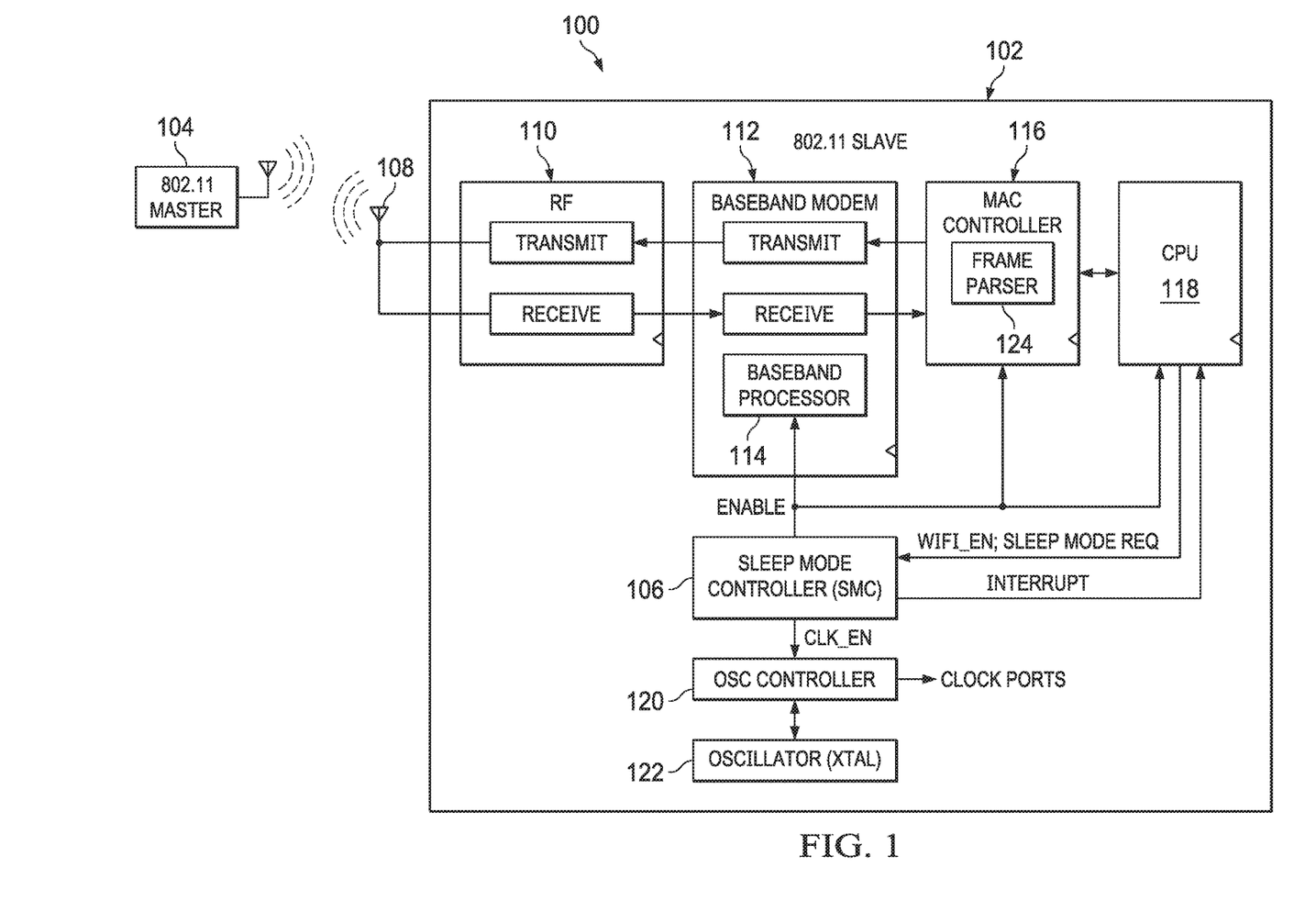
FIG. 1 is an illustration of an example system utilizing a highly programmable hardware sleep cycle controller for wireless devices supporting low-power, according to embodiments of the present disclosure.

FIG. 1 is an illustration of an example system 100 utilizing a highly programmable hardware sleep cycle controller for wireless devices supporting low-power, according to embodiments of the present disclosure. The wireless devices may communicate through IEEE 802.11 standards such as Wi-Fi or other suitable standards. System 100 may include any suitable number and kind of wireless devices. For example, system 100 may include a wireless device 104 and a wireless device 102. Wireless device 104 may be, for example, an access point, relay, base station, router, bridge, server, or gateway. Wireless device 102 may be, for example, a consumer device, watch, laptop, tablet, Internet of Things device or appliance, or smart phone. These examples are non-limiting. Wireless device 102 and other wireless devices may be in communication with wireless device 104 but are not shown. Wireless device 104 may be configured to send a variety of control signals in addition to data communication to wireless device 102. Wireless device 102 may be referred to a slave device with respect to wireless device 104, designated as a master device. Wireless device 102 may communicate through wireless device 104 in order to communicate with a larger network of elements.

The programmable hardware sleep cycle controller may be implemented on any suitable wireless device of system 100. For example, wireless device 102 may include sleep mode controller (SMC) 106. SMC 106 may be implemented in any suitable manner, such as by analog circuitry, digital circuitry, instructions for execution by a processor, or any suitable combination thereof. SMC 106 may be configured to control sleep mode of various elements of wireless device 102. For example, SMC 106 may be configured to set elements of wireless device 102 into a reduced power usage mode, remove clock signals from such elements, or shut such elements off. SMC 106 may be configured to allow wireless device 102 to remain connected to wireless device 104 while maintaining elements of wireless device 102 into such sleep modes. SMC 106 may be configured to allow such connections and sleep modes while awaiting data from wireless device 104. Furthermore, SMC 106 may be configured to allow such connections and sleep modes while waiting until a programmable wakeup-packet is received from wireless device 104. In one embodiment, SMC 106 may be configured to perform such tasks without waking a central processing unit (CPU) 118 for these tasks.

Wireless device 102 may include any suitable number and kind of elements. For example, wireless device 102 may include an antenna 108 coupled to a radio-frequency (RF) circuit 110 or module. RF circuit 110 may include transmit and receive sub-circuits configured to propagate or receive signals from antennae 108. RF circuit 110 may include a physical layer to modulate electromagnetic signals to be sent through or received through antennae 108. RF circuit 110 may include one or more phase-locked loops (PLLs) for receiving or sending signals. RF circuit 110 may be implemented by analog circuitry, digital circuitry, or any suitable combination thereof.

Wireless device 102 may include a baseband modem 112. Modem 112 may include transmit and receive sub-circuits configured to control the modulation of signals in RF circuit 110. Modem 112 may include a baseband processor 114. Baseband processor 104 may be configured to issue control signals to the transmit and receive sub-circuits to control the modulation of signals in RF circuit 110. Baseband processor 104 may be implemented with any suitable chip, microcontroller, processor, or other electronic device. Baseband processor 104 may be configured to perform encoding and decoding or modulation and demodulation of signals that are to be issued or received from the RF circuit 110. Baseband modem 112 may perform an interface between PHY layer operations on RF circuit 110 and MAC layer operations on MAC controller 116.

Wireless device 1032 may include a medium access control (MAC) controller 116. MAC controller 116 may be implemented by any suitable combination of digital or analog circuitry. MAC controller 116 may be configured to interface data and commands between CPU 118 and baseband modem 112.

Wireless device may include one or more clock sources, such as oscillator 122. Oscillator 122 may be implemented in any suitable manner, such as by an RC oscillator or a crystal oscillator. Oscillator 122 may operate when a voltage is applied thereto. Oscillator 122 may be controlled and powered by oscillator controller 120. Oscillator controller 120 may be implemented by any suitable combination of analog and digital circuitry. Oscillator controller 120 may be configured to modify clock signals from oscillator 122 and route such signals to each of the other elements of wireless device 102, such as RF circuit 110, baseband modem 112, MAC controller 116, and CPU 118.

In one embodiment, SMC 106 may be configured to implement multiple different sleep, reduced power, or shut-down modes. Moreover, SMC 106 may be configured to selectively apply any such modes to one or more elements of wireless device 102. For example, SMC 106 may apply a given mode to one element of wireless device 102 while maintaining operation of other elements of wireless device 102, or placing yet other elements of wireless device 102 in different modes. In another embodiment, SMC 106 may be configured to control application of clock signals to the elements of wireless device 102. The application of clock signals may implement, fully or in part, the modes of operation of the other elements of wireless device 102. SMC 106 may be configured to power up or power down such elements. SMC 106 may be configured to control such power up or power down on the basis of expected received signals, or in response to such signals.

For example, SMC 106 may issue an enable or disable signal to baseband modem 112. Such an enable or disable signal may also have the effect of enabling or disabling operation of RF circuit 110. In another example, SMC 106 may issue an enable or disable signal to MAC controller 116. Each connection between SMC 106 and respective other elements of wireless device 102 may be separate and distinct. Thus, SMC 106 may be configured to separately and selectively disable or enable the other elements of wireless device 102.

In another example, SMC 106 may enable or disable oscillator 122 or oscillator controller 120. This may have the effect of enabling or disabling the clock signal that is issued from oscillator 122 to various other elements of wireless device 102. SMC 106 may enable or disable other oscillators (not shown) in a similar manner. Elements of wireless device 102 such as RF circuit 110, baseband modem 112, MAC controller 116, or CPU 118 may receive a clock signal (whether modified or original) from oscillator 122. When a clock signal to such elements of wireless device 102 is not enabled, the elements may be effectively powered down.

At various times, CPU 118 may have no other pending tasks to execute. Upon recognition of no other pending tasks to execute, SMC 106 may be enabled to shut portions of wireless device 102 down upon notification by CPU 118 through a sleep mode request. CPU 118 may in turn be woken by SMC 106 through an interrupt or re-enabling of clock operations. Furthermore, CPU 118 may be woken through other events from other elements not shown, such as a user activating a button, or another subsystem (not shown) generating an interrupt. Furthermore, CPU 118 may enable WIFI operations and subsequent waking by issuing a WIFI_EN signal to SMC 106. Upon such a signal, SMC 106 may be configured to wake other elements of wireless device 102 or reengage a clock for such elements. CPU 118 may issue such an enable if, for example, it is preparing to send data to wireless device 104.

In one embodiment, SMC 106 may be configured to control the power up and power down cycling of CPU 118 when data is not being received from any other source, such as wireless device 104. If, for example, no data is to be sent out from wireless device 102, and no data is to be received at wireless device 102 from wireless device 104, CPU 118 may be shut down in a sleep mode by SMC 106. CPU 118 may have no other pending tasks to execute. Upon recognition of no other pending tasks to execute, SMC 106 may be enabled to shut portions of wireless device 102 down upon notification by CPU 118 through a sleep mode request.

In one embodiment, in a sleep mode SMC 106 may disable CPU 118 activity while periodically allowing operation of RF circuit 110 and baseband modem 112 to check for TIM or other messages received from wireless device 104 indicating that further data is to be sent. Upon receipt of such a TIM or other message, SMC 106 may be configured to wake or enable CPU 118 or MAC controller 116. Such a sleep mode may be performed when there is inactivity of active data transmissions over the wireless connections between wireless devices 102, 104. The TIM message may be an indication of resumption of such active data transmissions.

In one embodiment, SMC 106 may be configured to stop clock operation to MAC controller 116 or CPU 118 during such a sleep mode. In a further embodiment, SMC 106 may be configured to stop clock operation to baseband modem 112 and RF circuit 110 in a sleep mode except during specific times in a cycle when a TIM, frame, or other similar message is scheduled to be received. In another embodiment, SMC 106 may be configured to turn off or disable clock operation for PLLs of RF circuit 110 during the sleep mode. In yet another embodiment, SMC 106 may be configured to power-down RF circuit 110 during such a sleep period. SMC 106 may be configured to power-up RF circuit 110 at during specific times in a cycle when a TIM, frame, or other similar message is scheduled to be received.

In order to put elements of wireless device 102 to sleep or power-down mode, and to appropriately and selectively wake elements of wireless device 102, SMC 106 may be configured to implement 802.11 timing synchronization function (TSF) counters. Such TSF counters may have counterparts in MAC controller 116. Upon power-down of RF components, the value of TSF counters in MAC controller 116 may be coped to those in SMC 106, and restored upon power-up of MAC controller 116. The TSF counters may be updated in SMC 106 during the power-down. In order to conduct such timing while powering down other elements and suppressing oscillator output thereto, SMC 106 may include a clock separate from oscillator 122. For example, SMC 106 may include a low-power clock operating a 32 MHz. Such a clock may be sufficient for SMC 106 to determine windows of time when a TIM, frame, or other message is to be received.

SMC 106 may use such a clock to time operation while RF circuit 110 (or other portions of wireless device 102 configured to listen for received messages) are powered down or are unclocked. Upon the passing of radio silence time and reaching the window of time when a TIM, frame, or other message is to be received, SMC 106 may be configured to power up the portions of RF circuit 110 or baseband modem 112 to listen for the TIM, frame, or other message to be received. If no such message is received, or if the message received indicates that there is not additional data to be received, RF circuit 110 and baseband modem 112 may be powered down again until the next such window of time. If such a message is received and indicates that there is additional data to be received, RF circuit 110 and baseband modem 112 may be powered on after receipt of the message in order to receive the additional data. Moreover, SMC 106 may power up CPU 118 as a result of such a message in anticipation of processing the data that will be received.

Wireless device 102 may include any suitable mechanism for listening for the TIM, frame, or other message to be received. For example, wireless device 102 may include a frame parser 124. Frame parser 124 may be implemented by analog circuitry, digital circuitry, combinatorial logic, instructions for execution by a processor, or any suitable combination thereof. Frame parser 124 may be configured to operate independently of CPU 118. Accordingly, when CPU 118 is off or unclocked, frame parser 124 may nonetheless be configured to operate. Frame parser 124 may also be known as a beacon parser. Frame parser 124 may be configured to listen for the TIM, frame, or other message to be received at a designated time by wireless device 102. Frame parser 124 may be implemented in any suitable part of wireless device 102. For example, frame parser 124 may be implemented in MAC controller 116. In other examples, frame parser 124 may be implemented in SMC 106 or independently. Frame parser 124 may be powered up or powered down, or clocked or unclocked, along with other circuitry in which frame parser 124 is implemented. Frame parser 124 may be powered up or clocked when a TIM, frame, or other message is to be received at wireless device 102. Frame parser 124 may be powered down or unclocked at other times in appropriate sleep or snooze modes.

In one embodiment, during a power down or sleep mode, oscillator 122 may be kept operational while elements such as RF circuit 110, baseband modem 112, MAC controller 116, frame parser 124, or CPU 118 are powered down. This may reflect a distinct power mode separate from other power modes wherein oscillator 122 is also powered down in addition to one or more such elements. Such an embodiment may exist, for example, if a separate clock for the operation of SMC 106 is unavailable. Moreover, such an embodiment may be used when excitation and phase locking of oscillator 122 and its clock signals take a significant amount of time to initialize. In addition, such an embodiment may be used when CPU 118 is to be performing other processing tasks and requires use of oscillator 122, but RF communications are halted.

Accordingly, in one embodiment SMC 106 may be configured to provide a sleep mode wherein oscillator 122 is shut down or withheld from elements of wireless device 102. Furthermore, in another embodiment SMC 106 may be configured to provide a sleep mode wherein oscillator 122 is still operational. When oscillator 122 is still operational, it may be provided to one or more elements of wireless device 102. Such elements may include SMC 106 itself in a further embodiment. Such elements may include CPU 118 in another, further embodiments. Selection of the sleep mode may depend upon whether oscillator 122 is needed by some elements while other elements are asleep. In modes when oscillator 122 is still operational, SMC 106 may disable elements of wireless device 102 with an enable or disable signal to put these elements in a sleep mode. Putting elements into a sleep mode by depriving the element of a clock signal may be a synchronous sleep mode. Putting elements into a sleep mode by providing a separate enable or disable signal may be an asynchronous sleep mode.

SMC 106 may be configured to correctly time or sequence resumption of operation from sleep mode for elements of wireless device 102. For example, some elements of wireless device 102 may require specific start-up sequences in order to function properly. The elements may themselves include power regulation or receive power from power regulators that have initialization phases. SMC 106 may begin power-up in a manner to support, for example, a phased start of a low-dropout (LDO) power converter, or the sequence of oscillator initialization with applying voltage to the oscillator and then waiting for the frequency to settle. Furthermore, SMC 106 may be configured to store the state or status of various elements of wireless device 102 upon powering down such elements, and then to restore such elements upon resumption of operation. For example, modulation parameters, last-used values, or other configuration data of RF circuit 110 or baseband modem 112 may be saved to a register or flip-flops by SMC 106 upon power-down.

SMC 106 may operate power-on and power-off cycles without firmware or user intervention. SMC 106 may perform cycling in and out of low-power modes or states completely in hardware without the need for any intervention from the host controller or software.

SMC 106 may be configured to initiate sleep modes, and particular ones of available sleep modes, on any suitable basis. For example, SMC 106 may receive an indication to enter sleep mode through a register value set by software, an internal bus or signal line, or on its own if it detects no data operations on RF portions of wireless device 102.

Elements of wireless device 102 may operate in different power domains or subsystems. RF circuit 110 may operate on a 1.5V independent power domain. OSC controller 120 may operate in a its own power domain. Baseband modem 112 and MAC controller 116 may operate in a distinct power domain, or may operate together with the remaining elements in a power domain.

Figure 2:
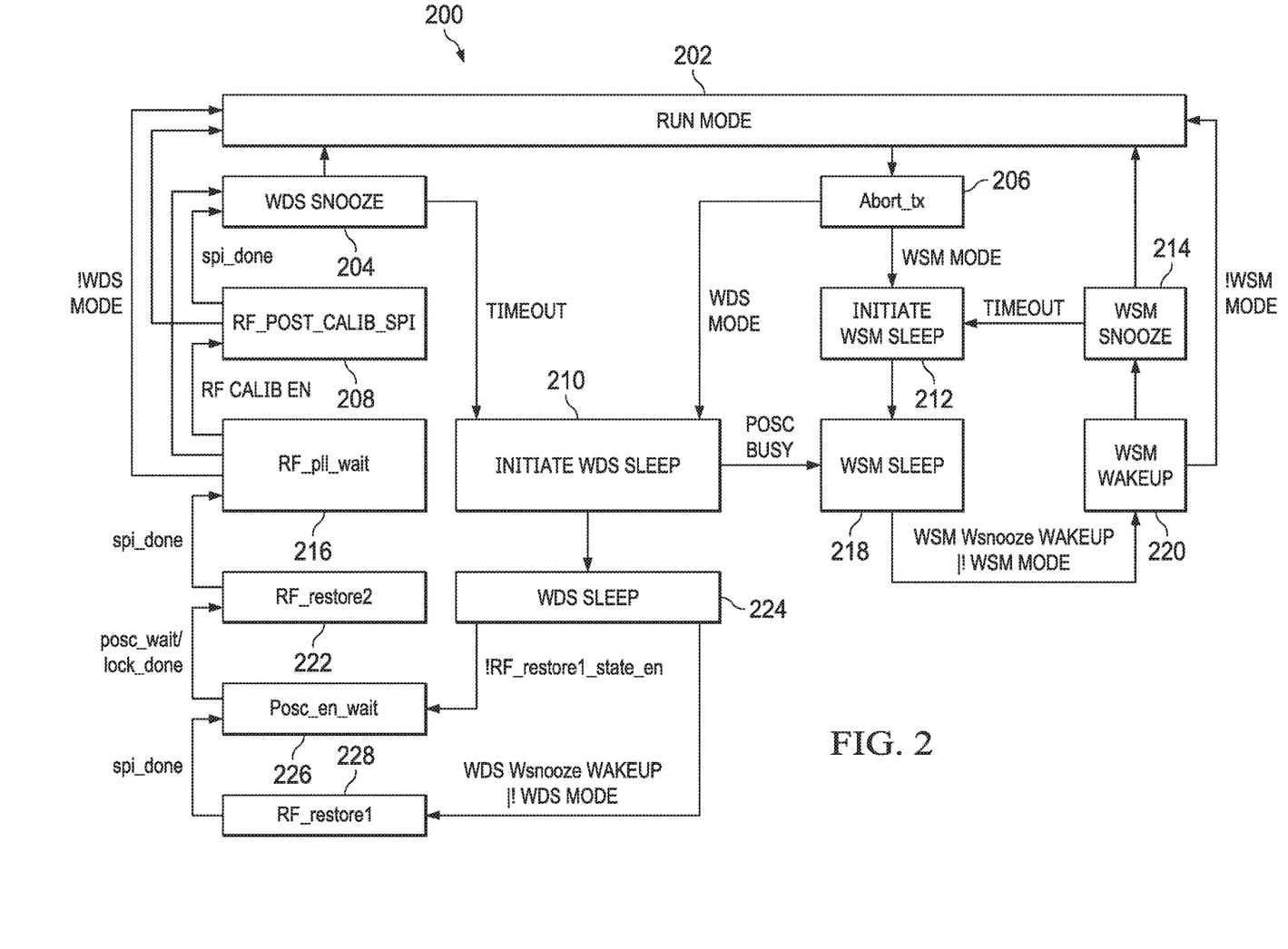
FIG. 2 is an illustration of an example finite state machine showing example operation to send portions of a wireless device into sleep modes and states, according to embodiments of the present disclosure.

FIG. 2 is an illustration of an example finite state machine (FSM) 200 showing example operation of SMC 106 to send portions of wireless device 104 into sleep modes and states, according to embodiments of the present disclosure. FSM 200 may illustrate the operation of digital circuitry, combinatorial logic, firmware operating below the level of operating systems of a processor of system 100, or other suitable implementations.

A run mode may be shown in state 202 wherein no sleep modes or power-down operations are in effect. One or more sleep modes may be used, such as in states 224, 218. FSM 200 illustrates additional operations that may be performed going into or out of these run or sleep states.

Powered-down Wi-Fi operation may include various sleep modes and states. In some cases, a mode may feature portions of wireless device 102 transitioning through different power states in such a mode. Each mode may have different levels of sleep states achieved within it. For example, wireless deep-sleep mode (WDS) mode utilizes the lowest power state for RF communications by turning RF circuit 110 off completely in addition to turning off oscillator 122 for RF circuit 110. WDS sleep mode may be shown in state 224. In another example, wireless sleep mode (WSM) may keep oscillator 122 active while turning RF circuit 110 off so that wireless device 102 may be able to wake faster, yielding a nimbler operation. WSM sleep mode may be shown in state 218.

Furthermore, each sleep mode may have the ability to enter a sleep state or a snooze state (in addition to a fully operational state). In one embodiment, a snooze state may be a transient state wherein portions of wireless device 104 transition into or transition out of WSM or WDS mode. The sleep state may be a state at which wireless device 104 has fully transitioned into WSM or WDS mode. Snooze states may be entered upon exit of sleep state or immediately predicate to entering sleep state. SMC 106 may be configured to move portions of wireless device 104 into snooze or sleep states. WDS snooze state may be implemented by state 204. WSM snooze state may be implemented by state 214.

In snooze and sleep states, transmitter and receiver chains of RF circuit 110 may be shut off. In sleep states, transmitter and receiver chains of RF circuit 110 may be shut off and modem 112 and MAC controller 114 may not have a clock signal received from oscillator 122 (that is, unclocked or ungated). The snooze state may be entered periodically or upon a wakeup event as wireless device 104 awakes periodically to check for TIM messages, wireless device 104 awakes upon demand, or wireless device 104 enters sleep periodically upon a timeout or after checking for TIM messages. Behavior of snooze states may be the same or similar in WSM and WDS modes.

Once WDS or WSM mode is entered, SMC 106 may be configured to control power or clock signals to RF circuit 110, modem 112, MAC controller 116, and CPU 118. SMC 106 may be configured to automatically and periodically switch between run, sleep and snooze states in the specified sleep mode. Wait times for the duration of sleep and snooze states may be programmable. Furthermore, more specific features such as PLLs for RF circuit 110 may be programmable. For example, SMC 106 may be configured to recalibrate such a PLL every sleep cycle, or every N sleep cycles. In addition, snooze states may be altogether disabled. In such a case, SMC 106 may generate a wakeup interrupt after every sleep cycle.

In one embodiment, in WSM and WDS sleep modes, modem 112 and MAC controller 116 may be powered-on but their clock signals may be withheld. Thus, registers and finite state machine states may be retained for such elements. WSM and WDS modes might be entered only when there is no pending traffic. Furthermore, interrupts other than those that are a source of wakeup might be masked.

By default, elements of electronic device 102 may be in a run mode in state 202. In state 202, elements may be powered-on and receive a normal, expected clock signal from oscillator 122. Run mode in state 202 may be terminated by first terminating transmission in state 206. In one embodiment, each of the WDS or WSM sleep modes can be entered by hardware sleep mode requests. These may be driven by determinations by SMC 106 that no data is to be transmitted or received (based in turn off TIM or other messages), or on-demand by software or a user through setting of bits. A particular one of WDS or WSM to enter may be determined by control bits or the entity making the request. WDS and WSM sleep modes may include state 224 and state 218, respectively. Similarly, state 224 or state 218 may be exited upon hardware determinations from SMC 106 that a TIM or other message has been received, or upon-demand by software or a user of the system. In one embodiment, a combination of SMC 106 determinations in hardware and user or application-level input from software may be used to determine whether to enter or exit from sleep mode.

In state 206, FSM 200 will continue to different branches of operation depending upon whether WDS or WSM is to be used. If WSM is to be used, FSM 200 may proceed to state 212, wherein WSM sleep state is initiated.

State 212 may include operation similar to WSM snooze. When entering into the WSM-sleep state, SMC 106 may put MAC controller 116 in low power mode. SMC 106 may copy a value of a TSF timer into SMC 106. SMC may put modem 112 in low power mode. SMC 106 may then withhold clock signals to MAC controller 116 and modem 112. SMC 106 may then place RF circuit 110 into a sleep mode by turning off power. SMC 106 may be in state 218.

After a certain among of time, or upon a request to wake, SMC 106 may enter state 220. If snooze states are enabled, SMC 106 may enter run mode state 202 directly. A wakeup interrupt may be raised to CPU 118. If snooze is enabled, SMC 106 may enter state 214. Once in state 214, a snooze duration may be endured, or SMC 106 may wait for frame parser 124 to trigger. If a trigger is encountered, an interrupt will be issued to CPU 118 to wake up the system. If no data is received, and the snooze duration expires, FSM 200 may return to state 212.

Transition from state 214 to state 202 may include requesting a clock signal from a PLL of oscillator controller 120. SMC 106 may wait for the clock to arrive. TSF values and other timers may be restored to MAC controller 116. MAC controller 116 may be released from sleep mode. Modem 112 and RF circuit 110 may be released from power save mode. FSM may be operating in state 202.

If, at state 206, WDS is to be used, FSM 200 may proceed to state 210 to initiate WDS sleep. State 210 may include operation similar to WDS snooze. To transition to WDS, RF circuit 110 may be powered down, along with oscillator 122, and power converters, transmitter and receiver chains, and PLLs within RF circuit 110. SMC 106 may continue and put MAC controller 116 in a lower power mode, transfer MAC TSF timers or values, put modem 112 into low power mode, and stop clocks to modem 112 and MAC controller 116. FSM 200 may be in state 224.

Upon timer expiration or requested wake, SMC 106 may exit state 224. If snooze modes are not enabled, SMC 106 may go to state 202. If snooze is enabled, SMC 106 may go to state 204. However, going to state 204 may include a number of intermediate states or steps. Assuming RF circuit 110 was disabled, SMC 106 may go to state 228. Otherwise, SMC 106 may go to state 226. At state 228, RF circuit 110 may be put into a standby mode. At 226, oscillator 122 may be restarted. SMC 106 may wait for oscillator 122 to settle. At 222, other portions of RC circuit 110 may be enabled by applying the clock signal from oscillator 122. At 216, a request may be made of a PLL to operate. The clock may be applied to modem 112 and MAC controller 116. After waiting, at 208, modem 112 may restore its register values. To enter 204, MAC controller 116 may restore its TSF values and other timers. MAC controller 116 and modem 112 may be enabled. FSM 200 may be in state 204.

Once in state 204, a snooze duration may be endured, or SMC 106 may wait for frame parser 124. If a trigger is encountered, an interrupt will be issued to CPU 118 to wake up the system. If no data is received, and the snooze duration expires, FSM 200 may return to state 204.

Figure 3:
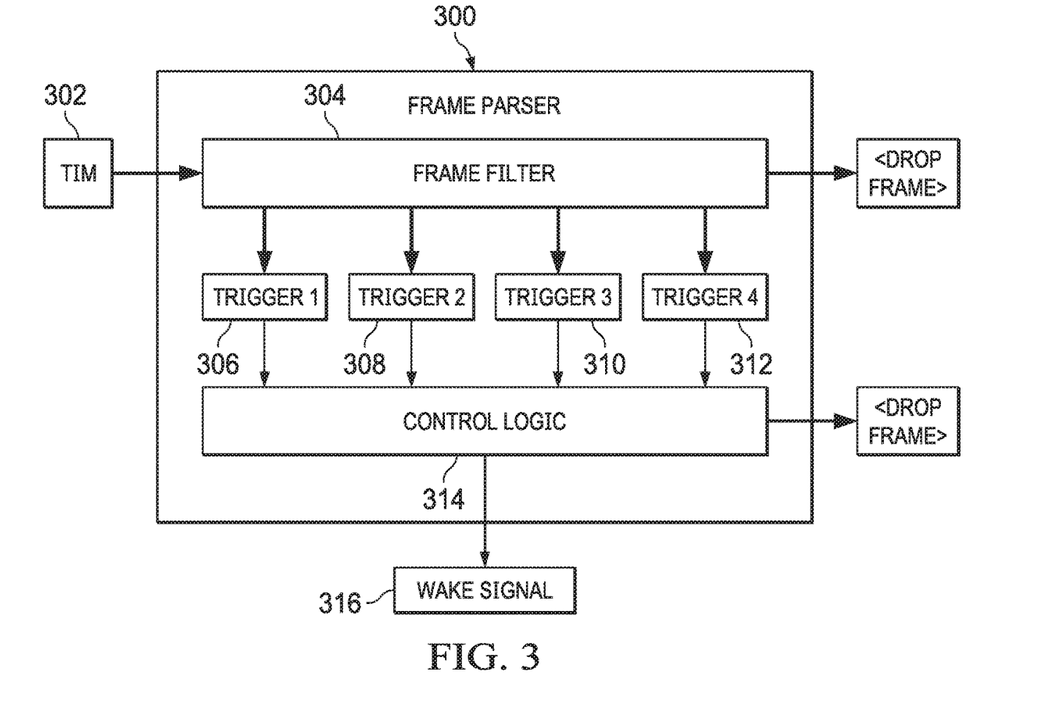
FIG. 3 is a more detailed illustration of a frame parser, according to embodiments of the present disclosure.

FIG. 3 is a more detailed illustration of a frame parser 300, according to embodiments of the present disclosure. Frame parser 300 may implement frame parser 124. Frame parser 300 may include a frame filter 304, multiple triggers such as trigger 1 306, trigger 2 308, trigger 3 310, and trigger 4 312, and control logic 314. These elements may be implemented by analog circuitry, digital circuitry, combinatorial logic, or any suitable combination thereof.

When powered on, or clocked, or otherwise enabled, frame parser 300 may wait for the arrival of a TIM 302 or other frame or message. TIM 302 may include header information identifying a target wireless device. Frame filter 304 may be configured to determine whether or not an 802.11 type or subtype identifier of a received frame such as TIM 302 matches the 802.11 type or subtype of the frames that are to be monitored for in, for example, the SMC. If the type or subtype device identifier or other identification in TIM 302 matches the expected frame type and subtype, frame parser 300 may continue to process TIM 302. Otherwise, frame parser 300 may discard or drop the frame.

Each of triggers 306-312 may process TIM 302 in parallel or serially. Triggers 306-314 may each include matching criteria with which to evaluate TIM 302. Although four triggers are shown in FIG. 3, frame parser 300 may include any suitable number of triggers. Each of triggers 306-312 may evaluate a portion of a header or other information of a frame in TIM 302. Each of triggers 306-312 may be separately enabled or disabled. Furthermore, control logic 314 may evaluate any suitable logical combination of results from triggers 306-312.

Each of triggers 306-312 may evaluate separate fields with the same criteria, a same field with different criteria, or combinations thereof. The particular triggers used and criteria used with such triggers may depend upon the communication protocol used by the wireless device, and how many portions of TIM 302 need to be matched to determine whether TIM 302 is instructing the wireless device to prepare to receive additional information.

If control logic 314 finds that the identified logical combination of matching results from triggers 306-312 is present, control logic 314 may issue a wake signal 316 to the rest of the wireless device. The matching fields of the selected ones and logical combination of triggers 306-312 may indicate that TIM 302 signals to the wireless device that additional information is to be received. Thus, other parts of the wireless device may power or wake. Otherwise, control logic 314 may drop TIM 302 or take no action. The wireless device may return to a deeper sleep state as shown in FIG. 2.

Action of frame parser 300 may be made independent of operation of other parts of the wireless device, such as the CPU. Framer parser 300 may thus check TIM 302 without requiring waking, powering on, or clocking such other elements of the wireless device. The configuration of operation of frame parser 300 may be made, for example, through suitable registers.

Frame parser 300 may be activated in any suitable phase of operation of the wireless device. As discussed above within the context of FIG. 2, frame parser 300 may be activated in, for example, the Wsnooze state when a TIM or other message or frame is received.

Each of triggers 306-312 that are enabled may perform a logical check on a designated field. The designated filed may be within TIM 302 or in any suitable part of any frame. The field may be, for example, eight bits wide. Each trigger (as defined by a register) may include a designation of the field that the trigger is to check. The field may be defined by an octet number. The octet number may be defined from a start of the frame. The frame control fields may be octets 0 and 1.

Each trigger (as defined by a register) may include designation, such as a bit, of whether a pattern search or a change evaluation is to be made to the field. The logical check may include other logical checks other than a pattern search or a change evaluation.

In a pattern search, another register value may designate the pattern that is to be used in parsing the field of TIM 302. The pattern may be designated by a bitmap filter, a defined pattern, or a combination thereof. A bitmap filter may identify which bits within the field are to be parsed. For example, a value of "1" set in a bit position identifies the bit to be parsed and evaluated. A value of "FF" selects all the bits in the field for parsing and analysis, while a value of "00" selects none. The defined pattern may be an 8-bit pattern to match TIM 302 within the identified field. When the selected bits indicated by the bitmap filter match the defined pattern, the trigger is activated.

In change detection, another register value may designate an eight-bit pattern of the identified field of TIM 302 that is to match a previous frame. In one embodiment, the pattern may define bits that must match for the trigger not to activate. For example, any deviation between the present TIM 302 and the previous frame at the designated bit locations (designated by the pattern) in the identified field may activate the trigger. In another embodiment, the pattern may define bits that must match for the trigger to activate.

Furthermore, a given trigger register may include a bit to indicate whether the trigger is enabled or disabled to be used. As discussed above, any suitable number of the available triggers may be enabled. In addition, the triggers may be combined together to make a more complex wakeup trigger criteria. The triggers may be combined with logical operations such as OR, AND, NOT, or XOR. The order of operations and the logical operations may be programmable through still further registers.

Operation of frame parser 300 may itself be enabled in any suitable manner. Frame parser 300 may be enabled or disable through a register value, an enable signal, power, or clock. Frames may be dropped if frame parser 300 is enabled and frames do not match trigger conditions. Otherwise, if frame parser 300 is disabled or if frames to match trigger conditions, the frames might not be dropped.

An example register for a given trigger may include fields such as
Trig Enable
Trig Mode
Trig Filter
Trig Pattern
Trig Octet Trig Enable may be a bit defining whether the given trigger will examine TIM 302 for patterns or changes. Trig Mode may be a bit defining whether the given trigger will perform pattern matching or perform change detection. Trig Filter may be eight bits (or otherwise the size of the field) and a mask applied on TIM 302 at the identified field before matching with Trig Pattern in pattern matching mode. Trig Filter may define the bits for which change is evaluated in change detection mode. Trig Pattern may be eight bits (or otherwise the size of the field) and a value for which frame parser 300 searches in the identified field. The search may be overlaid with the mask from Trig Filter. Trig Octet may define the field of TIM 302 for which search and comparison will be performed. Trig Octet may be eight bits wide, or any other suitable length.

An example register for frame parse 300 may include fields such as
Sub Type
Type
Sub Type Enable
Type Enable
Function0
Function1
Function2
Function0 Priority
Function1 Priority
Function2 Priority Type Enable may be a bit enabling filtering by frame filter 304 for types of frames according to 802.11. Sub Type Enable may be a bit enabling filtering by frame filter 304 for sub-types of frames according to 802.11. Type may be a field used when Type Enable is enabled. Type may define a pattern in received packets or TIM 302 for the 802.11 type that must match for additional analysis to proceed. Similarly, Sub Type may define a pattern in received packets or TIM 302 for the 802.11 sub type that must match for additional analysis to proceed.

Function0, Function1, and Function2 may each define combinations of triggers 306-312 that are to be performed. Function0 Priority, Function1 Priority, and Function2 Priority may define an order of operations between Function0-Function2.

For example, Function0 may specify a combination of trigger 1 306 and trigger 2 308. A "1" may specify that trigger 1 306 and trigger 2 308 are to be AND'd together, if both triggers are enabled. A "0" may specify that trigger 1 306 and trigger 2 308 are to be OR'd together, if both triggers are enabled.

Function1 may specify a combination of trigger 1 306, trigger 2 308, and trigger 3 310. A "1" may specify that these are to be AND'd together, if all the triggers are enabled. A "0" may specify that these are to be OR'd together, if all the triggers are enabled.

Function2 may specify a combination of trigger 1 306, trigger 2 308, trigger 3 310, and trigger 4 312. A "1" may specify that these are to be AND'd together, if all the triggers are enabled. A "0" may specify that these are to be OR'd together, if all the triggers are enabled.

Function0, Function1, and Function2 may thus be implemented by a bit specifying whether AND or OR are to be used for the particular combination. Function0 Priority, Function1 Priority, and Function2 Priority may be implemented by two bits to show the order or relative priority to the other functions. "00" may define first or highest priority, "01" may define second or next lowest priority, and "10" may define third or lowest priority.

Wherein trigger 1 is given as t1, trigger 2 as t2, trigger 3 as t3, trigger 4 as t4, Function0 as f0, Function1 as f1, and Function2 and f2, the set of possible combinations of trigger conditions can be given as

| Func0 priority | Func1 priority | Func2 priority | Output |
| --- | --- | --- | --- |
| 00 | 01 | 10 | $f_2(f_1(f_0(t_1, t_2), t_3), t_4)$ |
| 00 | 10 | 01 | $f_1(f_0(t_1, t_2), f_2(t_3, t_4))$ |
| 01 | 00 | 10 | $f_2(f_0(t_1, f_1(t_2, t_3)), t_4)$ |
| 01 | 10 | 00 | $f_1(f_0(t_1, t_2), f_2(t_3, t_4))$ |
| 10 | 00 | 01 | $f_0(f_2(f_1(t_2, t_3), t_4), t_1))$ |
| 10 | 01 | 00 | $f_0(f_1(f_2(t_3, t_4), t_2), t_1)$ |

Although a particular way of implementing register designations for the logical combination of triggers 306-312 that is to be used by frame parser 300 has been described above, any suitable manner of designating such a combination of triggers may be used.

Accordingly, SMC 106 may enable a very low-power architecture. Such an architecture may be useful for, for example battery-powered 802.11 IoT applications. SMC 106 may enable the system to avoid CPU activity needed for maintaining 802.11 connections with other wireless devices while there is inactivity for data communications.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

We claim:

1. A wireless device, comprising:
   a sleep mode controller circuit (SMC);
   a processor;
   a radio-frequency (RF) circuit; and
   an oscillator communicatively coupled to the processor and the RF circuit;
   wherein the SMC is configured to:
      identify from a first received message through the RF circuit that there is no impending data traffic to be received from another wireless device;
      based on the received message, put the wireless device into a power down mode, wherein the power down mode includes powering down the processor and powering down the RF circuit;
      periodically check for a second received message, including:
         powering on the RF circuit on a periodic basis;
         determining whether the second received message indicates that there is impending data traffic to be received from another wireless device; and
         based on a determination that that there is impending data traffic to be received from another wireless device, powering up the processor; and
   the wireless device further includes a frame parser circuit configured to, while the processor is powered down:
      periodically check for the second received message upon activation by the SMC;
      during the check for the second received message, identify whether the second received message identifies a type of the wireless device; and
      based on whether the second received message identifies the type of the wireless device, continue parsing the second received message.

2. The wireless device of claim 1, wherein the SMC is further configured to, based on a determination that there is no impending data traffic to be received from another wireless device, maintain the processor in a powered-down state.

3. The wireless device of claim 1, wherein powering down the RF circuit includes disabling a phase-locked-loop circuit of the RF circuit.

4. The wireless device of claim 1, wherein powering down the RF circuit includes disabling a clock signal from the oscillator to the RF circuit.

5. The wireless device of claim 1, wherein the SMC is further configured to maintain operation of the oscillator while the RF circuit and the processor are powered down.

6. The wireless device of claim 1, wherein the SMC is further configured to shut down the oscillator while the RF circuit and the processor are powered down.

7. The wireless device of claim 1, wherein the SMC is further configured to save and update a timer value upon powering down the RF circuit, the timer value recorded by a modem of the wireless device and configured to identify when the second message is to be received by the wireless device.

8. A wireless device, comprising:
   a sleep mode controller circuit (SMC);
   a processor;
   a radio-frequency (RF) circuit; and
   an oscillator communicatively coupled to the processor and the RF circuit;
   wherein the SMC is configured to:
      identify from a first received message through the RF circuit that there is no impending data traffic to be received from another wireless device;
      based on the received message, put the wireless device into a power down mode, wherein the power down mode includes powering down the processor and powering down the RF circuit;
      periodically check for a second received message, including the steps of:
         powering on the RF circuit on a periodic basis;
         determining whether the second received message indicates that there is impending data traffic to be received from another wireless device; and
         based on a determination that that there is impending data traffic to be received from another wireless device, powering up the processor; and
   the wireless device further includes a frame parser circuit configured to, while the processor is powered down:
      periodically check for the second received message upon activation by the SMC;
      during the check for the second received message, identify a field of the second received message upon which to perform pattern matching; and
      perform pattern matching on the second received message with a pattern designated for the frame parser circuit, the pattern to match the first received message.

9. The wireless device of claim 1, wherein the frame parser circuit is further configured to, while the processor is powered down:

periodically check for the second received message upon activation by the SMC;

during the check for the second received message, identify a field of the second received message upon which to perform differencing analysis; and based upon the field of the second received message differs from a corresponding field of a previously received message, determine that the second received message indicates that there is impending data traffic to be received from another wireless device.

10. A method, comprising:

identify from a first received message at a wireless device through a radio frequency (RF) circuit that there is no impending data traffic to be received from another wireless device;

based on the received message, put the wireless device into a power down mode, wherein the power down mode includes powering down a processor of the wireless device and powering down the RF circuit;

periodically checking for a second received message, including:
powering on the RF circuit on a periodic basis;
determining whether the second received message indicates that there is impending data traffic to be received from another wireless device; and
based on a determination that that there is impending data traffic to be received from another wireless device, powering up the processor; and while the processor is powered down:
periodically checking for the second received message;
during the check for the second received message, identifying whether the second received message identifies a type of the wireless device; and
based on whether the second received message identifies the type of the wireless device, continuing parsing the second received message.

11. The method of claim 10, further comprising, based on a determination that there is no impending data traffic to be received from another wireless device, maintaining the processor in a powered-down state.

12. The method of claim 10, wherein powering down the RF circuit includes disabling a phase-locked-loop circuit of the RF circuit.

13. The method of claim 10, wherein powering down the RF circuit includes disabling a clock signal from an oscillator to the RF circuit.

14. The method of claim 10, further comprising maintaining operation of an oscillator while the RF circuit and the processor are powered down.

15. The method of claim 10, further comprising shutting down an oscillator while the RF circuit and the processor are powered down.

16. The method of claim 10, further comprising saving and updating a timer value upon powering down the RF circuit, the timer value recorded by a modem of the wireless device and configured to identify when the second message is to be received by the wireless device.

17. A method, comprising:

identify from a first received message at a wireless device through a radio frequency (RF) circuit that there is no impending data traffic to be received from another wireless device;

based on the received message, put the wireless device into a power down mode, wherein the power down mode includes powering down a processor of the wireless device and powering down the RF circuit;

periodically checking for a second received message, including:
powering on the RF circuit on a periodic basis;
determining whether the second received message indicates that there is impending data traffic to be received from another wireless device; and
based on a determination that that there is impending data traffic to be received from another wireless device, powering up the processor; and while the processor is powered down:
periodically checking for the second received message;
during the check for the second received message, identifying a field of the second received message upon which to perform pattern matching; and
performing pattern matching on the second received message with a pattern designated for the field of the second received message, the pattern to match the first received message.

18. The method of claim 10, further comprising, while the processor is powered down:
periodically checking for the second received message;
during the check for the second received message, identifying a field of the second received message upon which to perform differencing analysis; and
based upon the field of the second received message differing from a corresponding field of a previously received message, determining that the second received message indicates that there is impending data traffic to be received from another wireless device.

* * * * *